(12) United States Patent
Stafford

(10) Patent No.: US 7,150,832 B2
(45) Date of Patent: Dec. 19, 2006

(54) APPARATUS FOR AND A METHOD OF TREATING ORGANIC WASTE

(75) Inventor: David Anthony Stafford, Cardiff (GB)

(73) Assignee: Enviro Control Limited, Cardiff (GB)

( * ) Notice: Subject to any disclaimer, the term of this patent is extended or adjusted under 35 U.S.C. 154(b) by 194 days.

(21) Appl. No.: 10/820,758

(22) Filed: Apr. 9, 2004

(65) Prior Publication Data

US 2006/0138046 A1    Jun. 29, 2006

(30) Foreign Application Priority Data

Apr. 11, 2003    (GB) .................................... 0308366

(51) Int. Cl.
  *C02F 3/30* (2006.01)
  *C02F 1/40* (2006.01)
(52) U.S. Cl. ...................... 210/605; 210/612; 210/629; 210/631; 210/209; 210/259
(58) Field of Classification Search ................ 210/605, 210/612, 620, 629, 631, 194, 195.1, 198.1, 210/205, 209, 252, 259
See application file for complete search history.

(56) References Cited

U.S. PATENT DOCUMENTS

| | | | |
|---|---|---|---|
| 3,166,501 A | 1/1965 | Spohr | |
| 4,511,370 A * | 4/1985 | Hunziker et al. | 48/197 A |
| 5,296,147 A * | 3/1994 | Koster et al. | 210/605 |
| 5,616,241 A * | 4/1997 | Khudenko | 210/151 |
| 5,616,304 A * | 4/1997 | Stormo | 422/227 |
| 6,287,469 B1 * | 9/2001 | Ashburn et al. | 210/605 |
| 6,514,410 B1 * | 2/2003 | Gantzer | 210/605 |
| 2002/0046972 A1 * | 4/2002 | Newman | 210/601 |
| 2002/0192809 A1 * | 12/2002 | Lanting et al. | 435/290.1 |
| 2003/0057152 A1 * | 3/2003 | Haridas | 210/603 |

FOREIGN PATENT DOCUMENTS

| | | |
|---|---|---|
| EP | 0 509 152 A1 | 10/1992 |
| EP | 06254588 | 9/1994 |
| GB | 1214701 | 4/1968 |
| GB | 2 110 658 A | 6/1983 |
| JP | 61-185372 * | 8/1986 |
| JP | 6-254588 | 9/1994 |
| KR | 2002-080192 * | 10/2002 |
| WO | 01/44119 A1 | 6/2001 |

OTHER PUBLICATIONS

PAJ abstract of JP 58027693 A (Nishihara) Feb. 18, 1983 (see abstract).

(Continued)

*Primary Examiner*—Fred G. Prince
(74) *Attorney, Agent, or Firm*—Young & Thompson

(57) ABSTRACT

The apparatus comprises an anaerobic digester for receiving organic waste, an aerobic digester, and a feed pump for pumping effluent from the anaerobic digester to the aerobic digester. The digesters each comprise a reaction vessel and each reaction vessel has a spray nozzle at or adjacent to its apex for spraying an anti-foam liquid at the contents of the vessel. A method of treating organic waste is also disclosed.

12 Claims, 3 Drawing Sheets

OTHER PUBLICATIONS

PAJ abstract of JP 5050080 A (Kubota) Mar. 2, 1993 (see abstract).
WPI abstract Accession No. 1998-036360 [04] & JP 9290286 A (Kubota) Nov. 11, 1997 (see abstract).
WPI abstract Accession No. 2003-303297 [30] & JP 2001286887 A (Kurita Water) Nov. 16, 2001 (see abstract).
WPI abstract Acession No. 1998-057333 [06] & JP 9299978 A (Hitachi) Nov. 25, 1997 (see abstract).
PAJ abstract of JP 5512893 A (Kubota) Sep. 19, 1980 (see abstract).

* cited by examiner

APPARATUS FOR AND A METHOD OF TREATING ORGANIC WASTE

This invention relates to apparatus for and a method of treating organic waste such as sewage sludge and animal manures.

The enforcement of EC Directives and USEPA guidelines on disposal of organic waste and their use in agriculture has brought about changes in sludge disposal practice as well as a need to study the options available and their cost-effectiveness. Treatment is required to reduce significantly the Pollution content of the sludge as well as its health hazard due to the presence of pathogens.

SUMMARY OF THE INVENTION

According to one aspect of the invention there is provided apparatus for treating organic waste, comprising an anaerobic digester for receiving the organic waste, an aerobic digester, and means for pumping effluent from the anaerobic digester to the aerobic digester, the digesters each having a reaction vessel and each reaction vessel having a spray nozzle at or adjacent to its upper end for spraying an anti-foam liquid onto the contents of the vessel.

The anti-foam liquid could be water or a mixture of water and an anti-foam agent.

According to a second aspect of the invention there is provided a method of the steps of:
a. feeding the organic waste into an anaerobic digester.
b. feeding and mixing the waste in the digester contents in a predetermined controlled cycle.
c. pumping effluent from the anaerobic digester to an aerobic digester.
d. mixing the organic waste in the aerobic digester with air by pumping the organic waste through a Venturi mixer which draws air into the organic effluent.
e. measuring the organic content of the effluent fed into the aerobic digester, and
f. varying the flow rate at which organic waste is pumped through the Venturi mixer according to the volume and organic content of the sludge fed into the aerobic digester, and
g. spraying an anti-foam liquid at the contents of both of the digesters.

The invention will now be more particularly described, by way of example, with reference to the accompanying drawings.

DESCRIPTION OF THE PREFERRED EMBODIMENT

Figure 1:
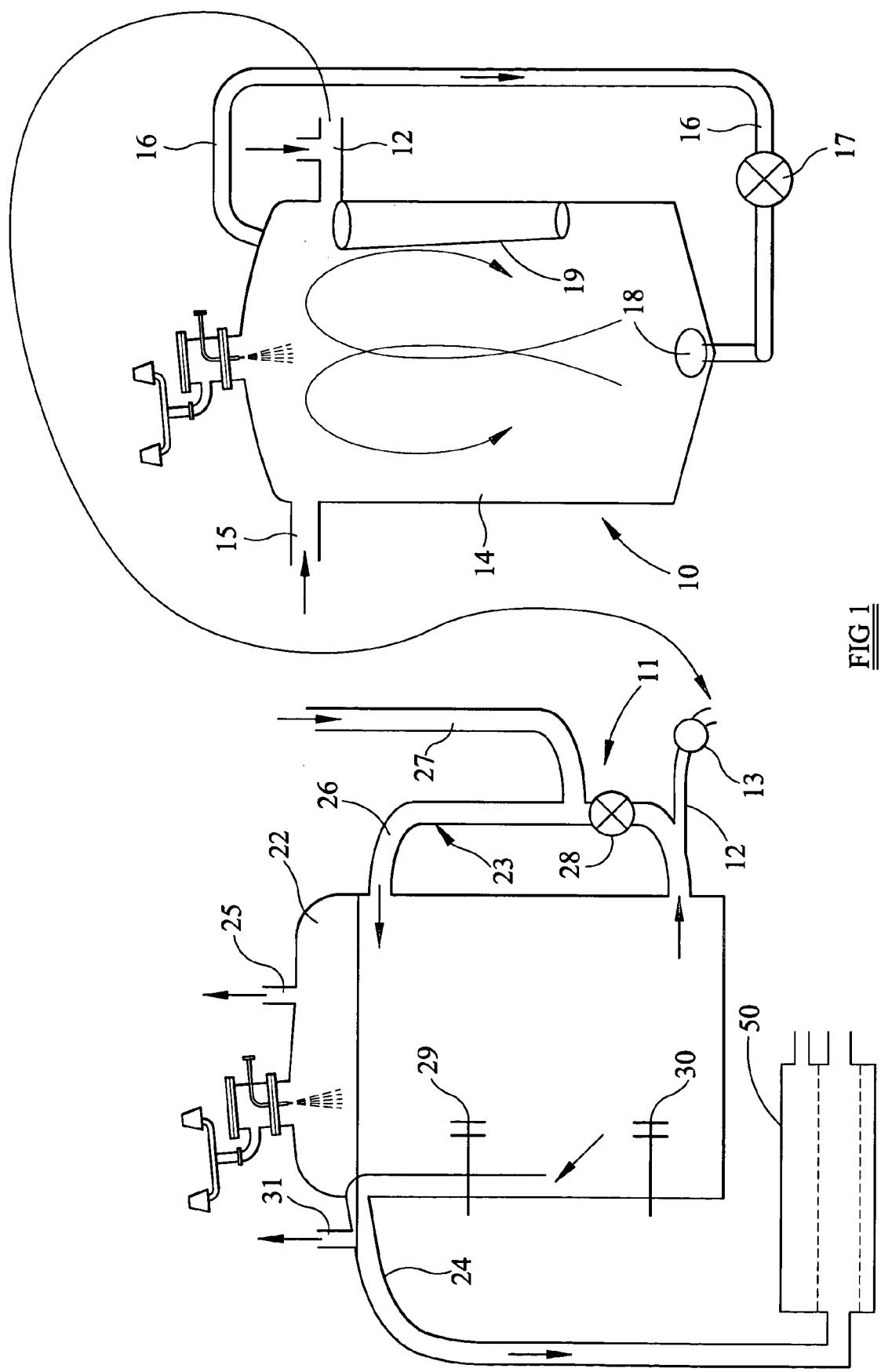
FIG. 1 is a schematic view of one embodiment of apparatus according to the first aspect of the invention.

Referring firstly to FIG. 1 of the drawings, the apparatus shown therein comprises an anaerobic digester 10, an aerobic digester 11, a feed line 12 connected between the upper end of the anaerobic digester 10 and the lower end of the aerobic digester 11 and a feed pump 13 for pumping effluent from the anaerobic digester 10 to the aerobic digester 11 through the line 12.

The anaerobic digester 10 comprises an insulated anaerobic reaction vessel 14 having an inlet pipe 15, a recycling pipe 16 and a recycle pump 17 for taking gas produced in the vessel 14 from the roof of the vessel 14 to the nozzle 18 in the centre of the base of the vessel 14. The recycle pump 17 is switched on intermittently and only after the feeding regime is concluded on a regular cycle. This can be hourly or whatever regular cycle chosen for a particular application. Feeding and mixing organic waste in the digester contents is thus in a predetermined controlled cycle. This produces a gentle rolling action for mixing the contents of the vessel.

The anaerobic digester 10 also includes a settlement tube 19 against the inside wall of the vessel 14. This has an inlet 20 above the base of the vessel and increases in cross-sectional dimensions as it extends upwards to the level at which effluent exits the vessel 14. The settlement tube allows the digester contents to exit the vessel 14. The increasing cross-sectional area as the contents move upwards reduces the rate of upflow speed of the contained particles. As a result the larger particles will tend to slow down as well as fall back and remain in the tank for longer than they would normally. This has the overall result of increasing the solids retention time.

Typically the organic waste will remain in the anaerobic digester for between about 6 and 15 days depending on the strength of the waste. Taking, by way of example, a vessel 14 having a capacity of 1,000 cubic metres and a retention time in the digester of 10 days, 100 cubic metres will be fed into the digester 10 each day. The feed pump (not shown) should be activated for predetermined periods related to the hydraulic retention time. As organic waste is fed into the anaerobic digester 10, effluent will leave the digester 10 via the feed line 12. This effluent can be fed directly to the aerobic digester 11 as shown in FIG. 1 or can be fed into a holding tank or reservoir (not shown) for subsequent transfer to the aerobic digester 11. Once the feeding regime to the digester 10 has finished, the pump 17 is switched on for a period required to provide adequate mixing in the reaction vessel 14. Typically this could be for a duration of from 5 to 30 minutes and is determined by the solid concentration of the material to be mixed. The higher the total solids concentration, the longer the material is mixed. After a further delay, typically of between 1 and 6 hours the cycle begins again with the feeding regime outlined above.

The aerobic digester 11 comprises an insulated aerobic reaction vessel 22, a Venturi mixer 23, a liquid outlet 24 and an air outlet 25. The Venturi mixer 23 comprises a recycle tube 26 connecting the lower end of the vessel 22 to the upper end of the vessel 22, an air inlet tube 27 connected to the recycle tube 26 intermediate the ends thereof and a recycle pump 28 for recycling effluent from the anaerobic digester 10 through the recycle tube 26 and past the inner end of the air inlet tube 27.

The line 12 is connected to the recycle tube 26 at the lower end thereof and upstream of the recycle pump 28.

Two temperature sensors 29, 30 are mounted in the reaction vessel 22. The temperature sensor 29 is mounted at a position above the sensor 30 so that the temperature of the effluent at two levels in the reaction vessel 22 can be monitored.

A syphon break tube 31 is connected to the liquid outlet 24.

In operation, effluent from the digester 10 is fed into the aerobic reaction vessel 22 through the inlet line 12 by the feed pump 13 and is recycled in the aerobic reaction vessel 10 through the Venturi mixer 23 by the recycle pump 28.

As the effluent is pumped through the Venturi mixer 23 by the pump 28, air is drawn into the effluent from the air inlet tube 27. The quantity of air drawn into the reaction vessel 22 in a given period of time can be varied by varying the flow rate at which the effluent is pumped through the Venturi mixer 23.

Because the effluent to be treated may vary as to its organic content (as measured by its contained volatile solids or Biological Oxygen Demand), it becomes important to control the rate of oxidation by means of knowing the incoming organic loading of the incoming effluent.

As the organic loading (measured in terms of kg of Volatile Solids per $M^3$ of reactor per day for example) increases, the rate of oxidation and mixing can be increased to provide sufficient aeration capacity for the microbes providing the metabolic heat. This process can be effected automatically by means of an automated BOD sensor and used to control the flow rate at which the effluent is pumped through the Venturi mixer 23. Thus, the quantity of air drawn into the effluent can be matched to the volume and strength of effluent fed to the reaction vessel 22 from knowledge of the volume of effluent fed into the vessel 22 by the feed pump 13 and from the organic content of that effluent.

In order to ensure that thermophylic aerobic digestion takes place, the effluent in the aerobic reaction vessel 22 must be maintained above a predetermined temperature and is usually maintained at between 55° C. and 70° C. The temperature sensors 29 and 30 monitor the temperature of effluent in the reaction vessel 22 and if this temperature falls below a predetermined value, the quantity of effluent fed into the reaction vessel 22 over a given time period is increased to increase the oxidisable organic carbon in the reaction vessel 22 and/or the flow rate at which the effluent is pumped through the venturi mixer 23 is increased to increase the quantity of air in the reaction vessel 22. The quantity of effluent fed into the reaction vessel 22 can be increased either by increasing the frequency at which the feed pump 13 is operated or by increasing the duration of feed.

In practice, the feed pump 13 will be operated intermittently, e.g. for about 10 minutes every three hours, and during operation of the feed pump 13, the recycle pump 28 can be switched off. This enables the treated effluent to be discharged from the vessel 22 before new effluent is mixed by the Venturi mixer 23 with the contents of the vessel 22. In this case, the incoming effluent will be fed into the lower end of the vessel 22.

Alternatively, the recycle pump 28 can remain on while the feed pump 13 is operating. In this case, some of the effluent will be fed into the lower end of the vessel 22 passing through the lower end of the recycle tube 26 against the flow of effluent being recycled through the recycle tube 26 and some of the effluent will be carried round with the recycled effluent and will be fed into the upper end of the reaction vessel 22.

The rate at which effluent is pumped through the Venturi mixer 23 can also be increased by increasing the speed of the recycle pump 28 if the differential temperature sensed by the temperature sensors 29 and 30 exceeds a certain value as this will indicate insufficient mixing of the contents of the vessel 22.

Figure 2:
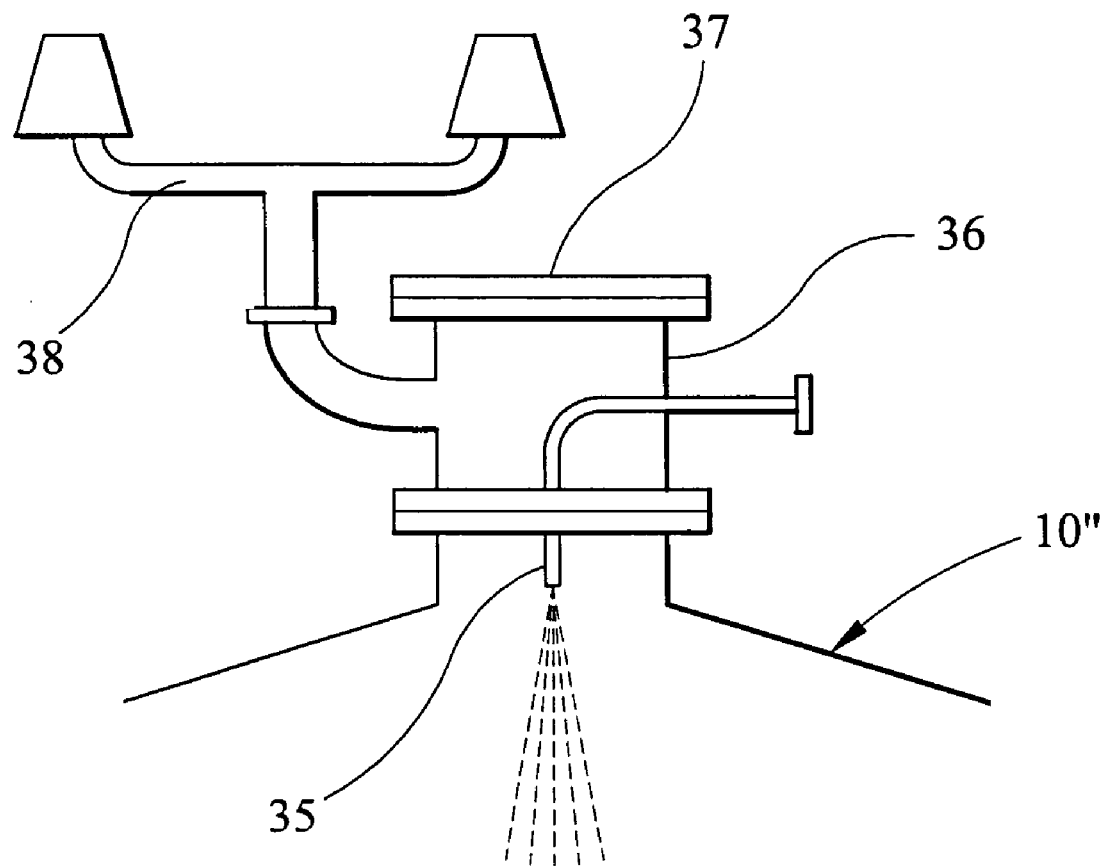
FIG. 2 is an enlarged view of the spray nozzle fitted to each reaction vessel of the apparatus.
Figure 3:
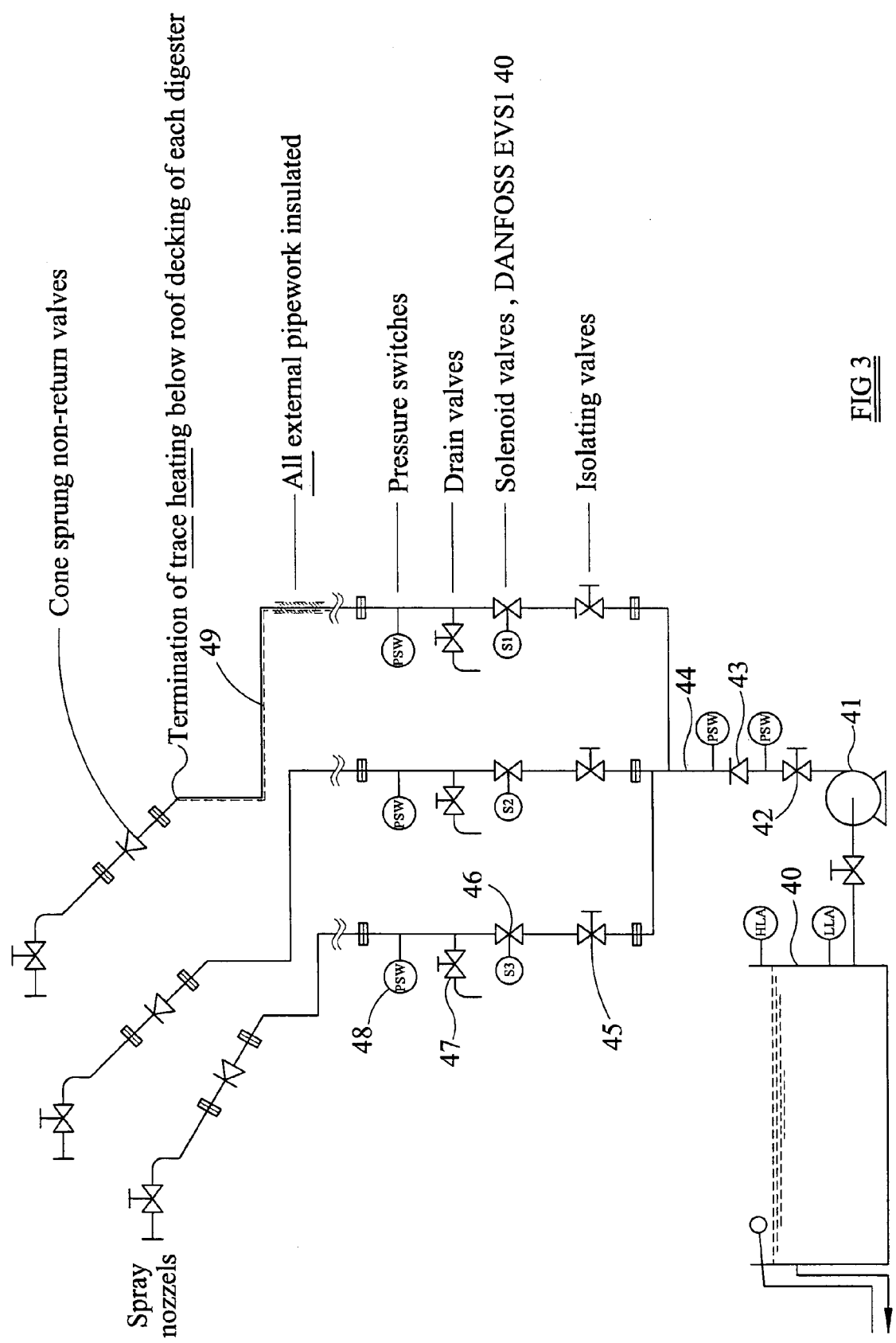
FIG. 3 shows a distribution network for the spray nozzles.

Foaming problems have occurred both in anaerobic and aerobic digesters and it is often not possible to identify the single causative agent, although it is generally accepted that textile industry effluent can cause foaming problems in a number of treatment processes. An anti-foam system is therefore included in each digester 10, 11. Without this system the digesters can only be operated at 50–70% of their design load and cannot treat all effluent produced on site. As best shown in FIG. 2, each foam system comprises a spray nozzle 35 mounted in an upstanding extension tube 36 at the apex of each reaction vessel 14, 22. The extension tube 36 has a viewing window 37 at its upper end and a gas vent 38 extending laterally and upwardly from the side of the upstanding extension tube 36. As shown in FIG. 3, the nozzles 35 are supplied with an anti-foam liquid, which could be water or a mixture of water and an anti-foam agent, from a tank 40 by pump 41. An isolating valve 42 and a non-return valve 43 are provided in the common supply line 44 for the nozzles 35 and each nozzle 35 also has its own dedicated isolating valve 45, its own dedicated solenoid valve 46, its own dedicated drain valve 47 in the supply to the nozzle 35 and its own dedicated pressure switch 48. The distribution pipes are protected from freezing by trace heating 49.

The nozzles 35 are used to evenly distribute the anti-foam liquid to the reaction vessel to physically disrupt the foam structure within the vessel.

Preferably, a reverse osmosis device 50 is provided downstream of the aerobic digester 11 and/or the anaerobic digester 10. The reverse osmosis device(s) 50 contains at least one semi-permeable membrane which allows dirty effluent from the digester to be cleaned when passing through it. The contained, dissolved and suspended solids are removed allowing the clean water to pass through the membrane under pressure and be recovered. Reverse osmosis is capable of removing bacteria, salts and dissolved organics from the anaerobic or aerobic digester effluent. The removal of charged salts with reverse osmosis is helped by the natural electrical charge on the particles. Many of the organic particles are charged as well as the inorganic molecules. Thus both are removed, but especially the latter group.

Modern reverse osmosis technology uses at least one cross-flow membrane to allow the membrane to continually clean itself. Reverse osmosis requires a driving force to force the fluid through the membrane and uses pressure from a pump (not shown).

It is possible to produce 90%–95% pure effluent with the apparatus described above and this can be recycled back to dilute the organic waste being fed into the anaerobic digester 10. This can result in a huge saving of clean water supplies which are at a premium particularly in some parts of the world. The recycling of the clean water to the beginning of the incoming flow at the anaerobic digester inlet allows a control of the concentration of waste feed to the digester 10.

A computer control system has been developed for the apparatus to enable remote monitoring and control. All pumps, motors, agitators etc. can be manually controlled locally in order to facilitate system check-out and start-up. Each device has a local auto/manual selector switch which is interlocked into the logic of the control system. For safety, placing any device in manual mode locks out the automatic mode.

Automatic sequencing for the anaerobic digester is accomplished through the use of a programmable logic controller (PLC) in the control room. All analogue and digital I/O passes through a PLC, which allows all devices to be monitored and controlled automatically. All fixed sequences and timing are controlled from the PLC.

Supervisory process control and data acquisition are accomplished through an IBM compatible computer (PC) operating under OS/2 or equivalent. The PC provides sufficient processing power to operate the control software and other programs in true multi-tasking mode. A hard disk provides local storage for programs and operating/laboratory data. The PC communicates with the PLC over an RS-232 interface using the MODBUS communications protocol or equivalent. A high speed internal modem provides remote communications capability for control and data exchange.

The above embodiment is given by way of example only and various modifications will be apparent to persons skilled in the art without departing from the scope of the invention as defined by the appended claims.

What is claimed is:

1. Apparatus for treating organic waste, comprising an anaerobic digester for receiving organic waste, an aerobic digester, and means for pumping effluent from the anaerobic digester to the aerobic digester, the digesters each comprising a reaction vessel and each reaction vessel having a spray nozzle at or adjacent to its upper end for spraying an anti-foam liquid at the contents of the vessel, wherein the aerobic digester further comprises Venturi mixer for mixing effluent in the reaction vessel with air, means for pumping effluent in the vessel through the Venturi mixer, means for measuring the organic content of the effluent fed into the vessel and means for varying the flow rate at which the effluent is pumped through the Venturi mixer according to the volume and organic content of the effluent fed into the vessel.

2. Apparatus as claimed in claim 1, further including means for monitoring the temperature of the effluent in the reaction vessel and means for increasing the quantity of effluent fed into the vessel over a given period and/or increasing the flow rate at which the effluent is pumped through the Venturi mixer if said temperature falls below a predetermined value.

3. Apparatus as claimed in claim 1, wherein the anaerobic digester comprises a mixing chamber and means for recycling gas produced at or adjacent to the upper end of the reaction vessel into the lower end of the vessel.

4. Apparatus as claimed in claim 3, wherein the recycling means comprises a recycle pump and a nozzle at or adjacent to the lower end of the vessel.

5. Apparatus as claimed in claim 3, wherein the anaerobic digester further comprises a settlement tube to increase the retention time of solids in the vessel.

6. Apparatus as claimed in claim 1, further comprising a reverse osmosis device downstream of the aerobic digester and/or anaerobic digester.

7. A method of treating organic waste comprising the steps of:
   a. feeding the organic waste into an anaerobic digester,
   b. feeding and mixing the waste in the digester contents in a predetermined controlled cycle,
   c. pumping effluent from the anaerobic digester to an aerobic digester,
   d. mixing the organic waste in the aerobic digester with air by pumping the organic waste through a Venturi mixer which draws air into the organic effluent,
   e. measuring the organic content of the effluent fed into the aerobic digester, and
   f. varying the flow rate at which organic waste is pumped through the Venturi mixer according to the volume and organic content of the sludge fed into the aerobic digester, and
   g. spraying an anti-foam liquid at the contents of both of the digesters.

8. A method as claimed in claim 7, wherein the anaerobic digester includes a settlement tube to increase the retention time of solids in the vessel.

9. A method as claimed in claim 7, wherein the effluent from the aerobic digester is pumped into a reverse osmosis device.

10. A method as claimed in claim 9, wherein the clean effluent extracted from the reverse osmosis device is used to dilute the organic waste fed into the anaerobic digester.

11. A method as claimed in claim 9, wherein the clean effluent extracted from the reverse osmosis device is used to provide clean effluent discharge to provide an effluent of a more exacting standard.

12. Apparatus for treating organic waste, comprising an anaerobic digester for receiving organic waste, an aerobic digester, and means for pumping effluent from the anaerobic digester to the aerobic digester, the digesters each comprising a reaction vessel and each reaction vessel having a spray nozzle at or adjacent to its upper end for spraying an anti-foam liquid at the contents of the vessel, wherein the anaerobic digester comprises a mixing chamber and means for recycling gas produced at or adjacent to the upper end of the reaction vessel into the lower end of the vessel, and wherein the anaerobic digester further comprises a settlement tube to increase the retention time of solids in the vessel.

* * * * *